(No Model.) 6 Sheets—Sheet 1.

L. A. SPRAGUE & C. DANCEL.
Machine for Making Barbed Fence Wires.

No. 242,706. Patented June 7, 1881.

Witnesses:
Chas. Nida.
William Miller

Inventors.
Leonard A. Sprague
Christian Dancel
by VanSanvoord & Hauff
their Attys.

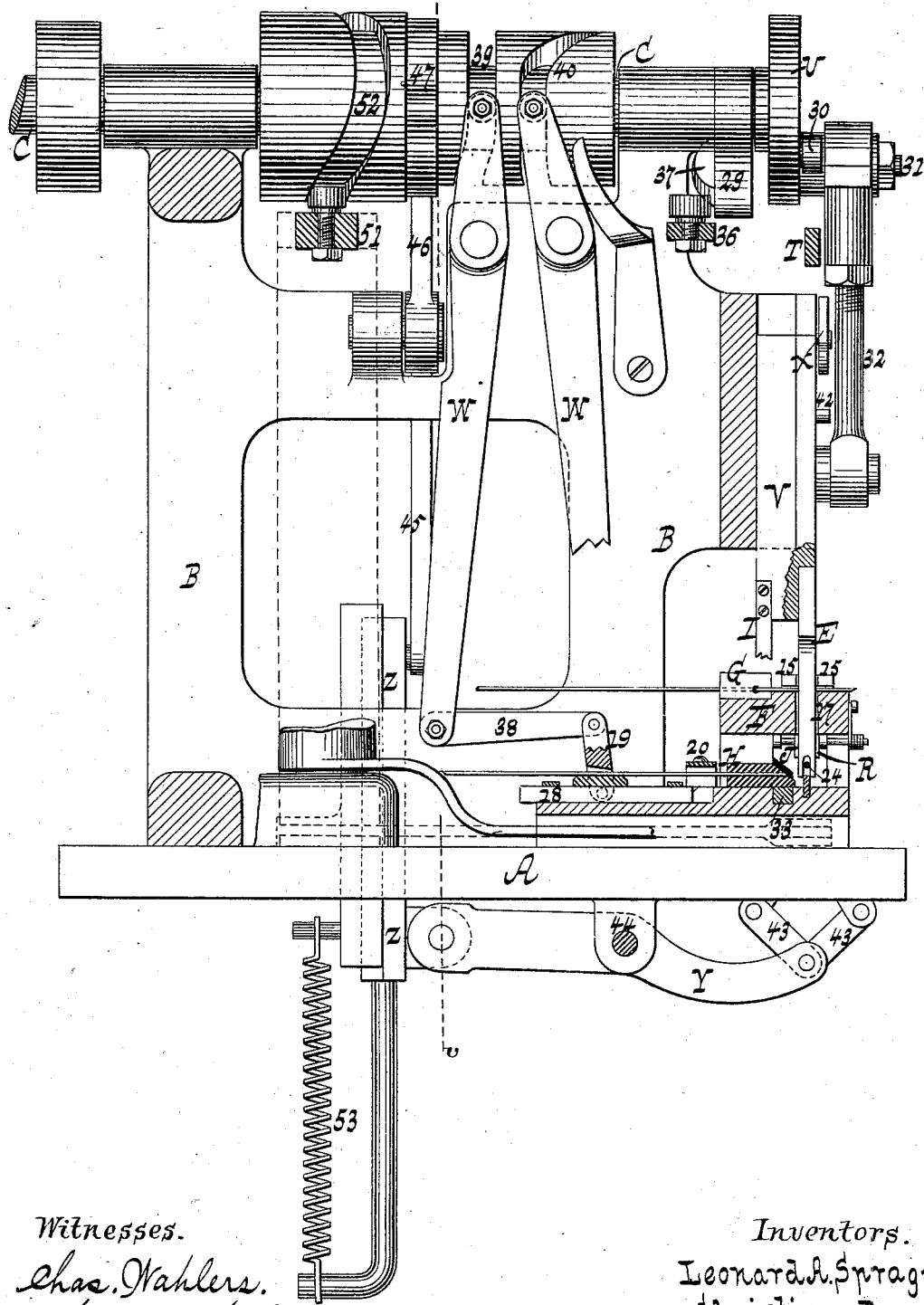

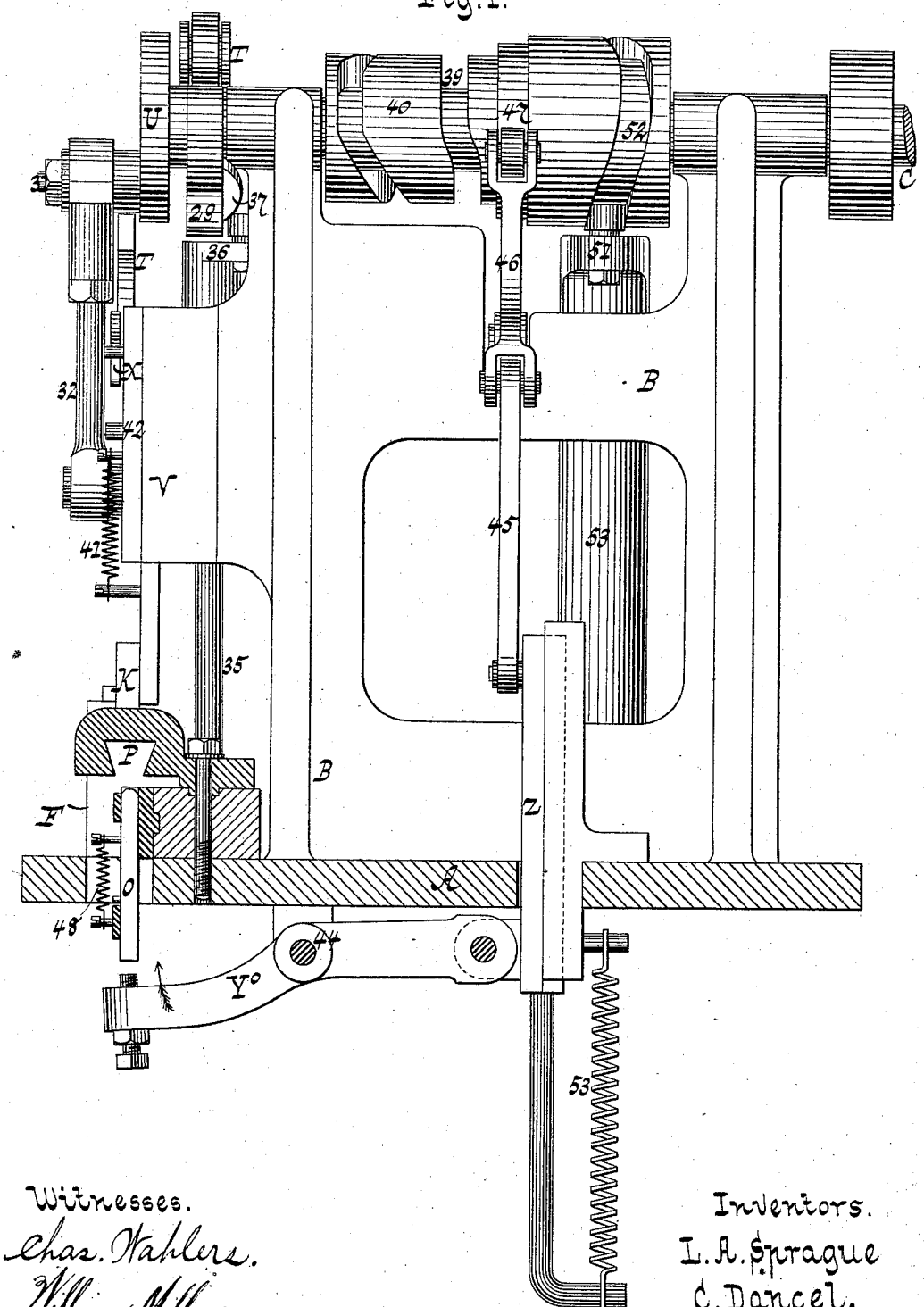

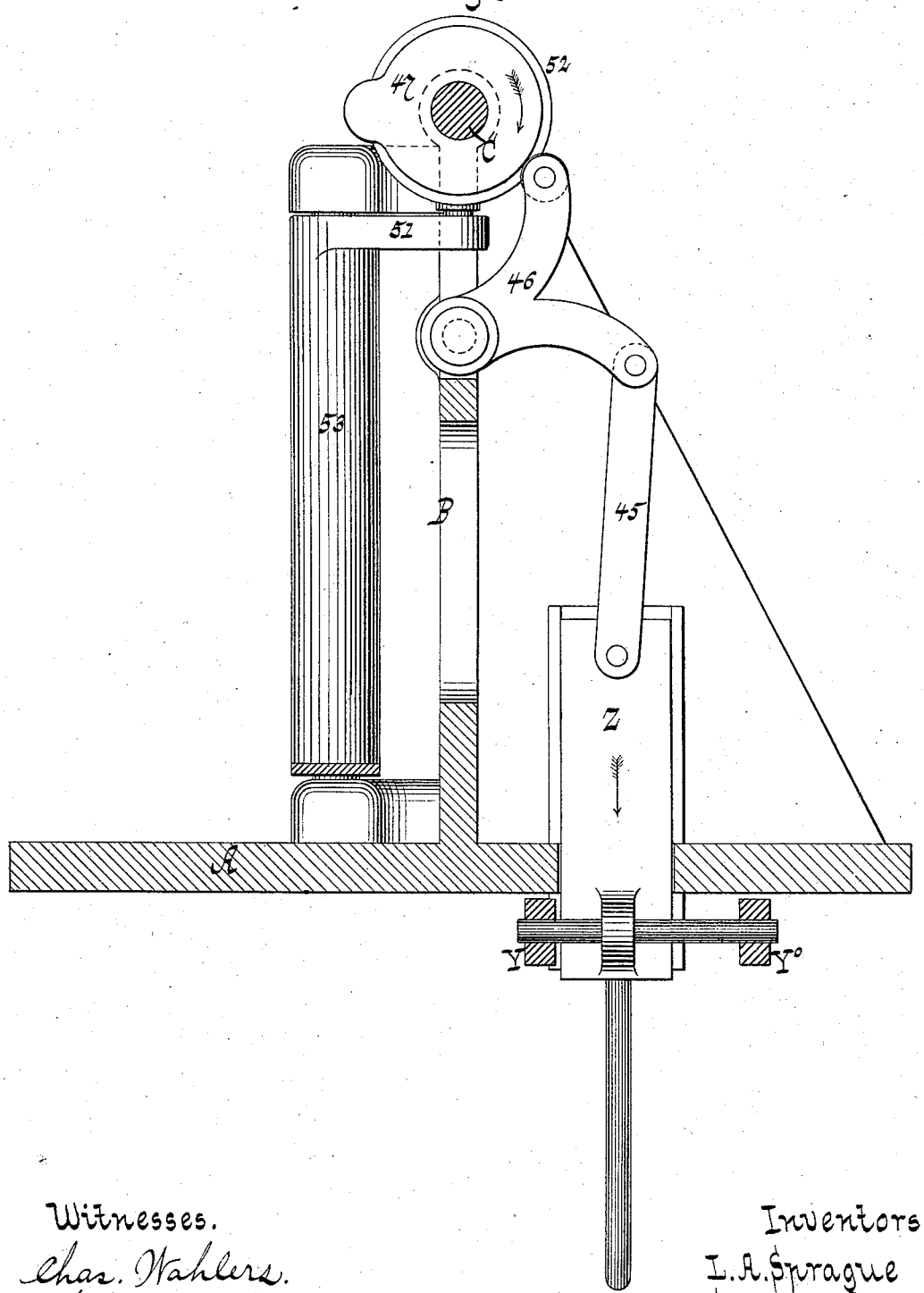

(No Model.) 6 Sheets—Sheet 5.
L. A. SPRAGUE & C. DANCEL.
Machine for Making Barbed Fence Wires.
No. 242,706. Patented June 7, 1881.
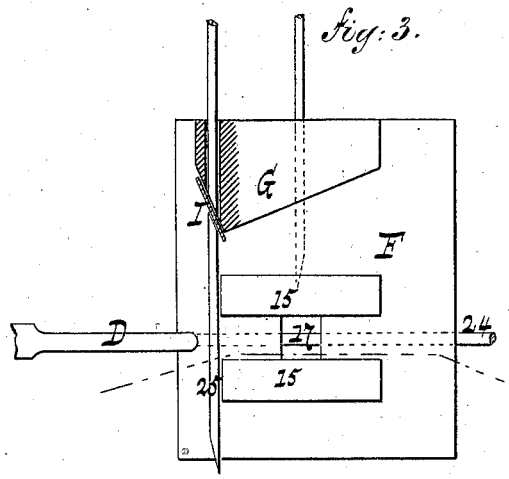
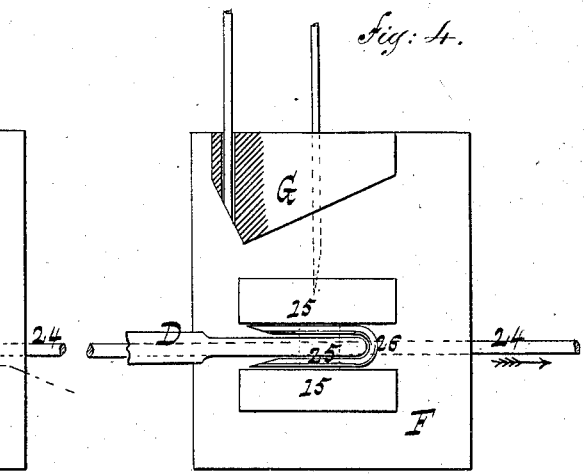
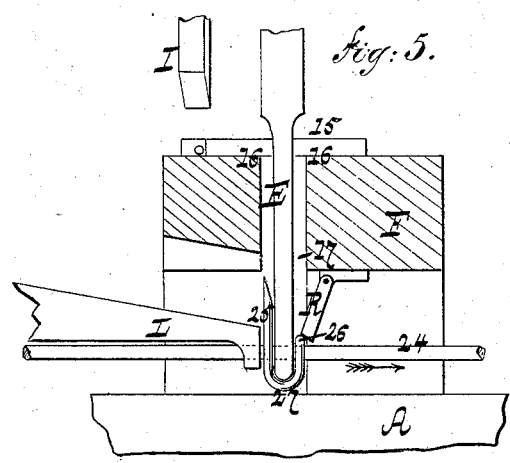
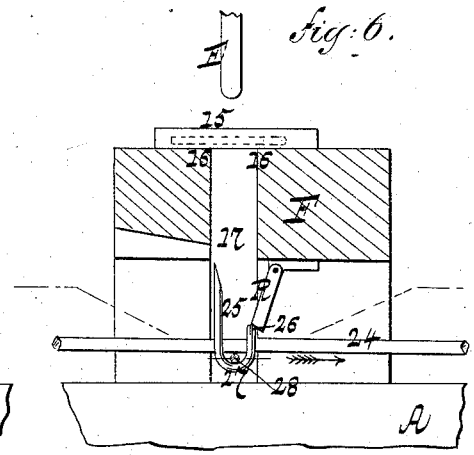
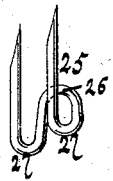
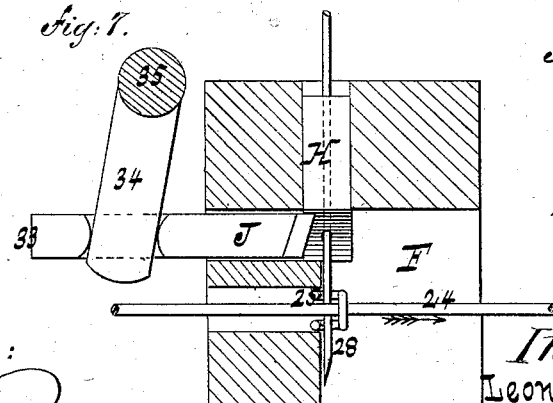
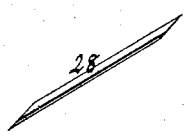
Witnesses:
Chas. Nida.
William Miller.
Inventors.
Leonard A. Sprague
Christian Dancel
by
VanSantvoord & Hauff
their Attorneys.

(No Model.) 6 Sheets—Sheet 6.
L. A. SPRAGUE & C. DANCEL.
Machine for Making Barbed Fence Wires.
No. 242,706. Patented June 7, 1881.
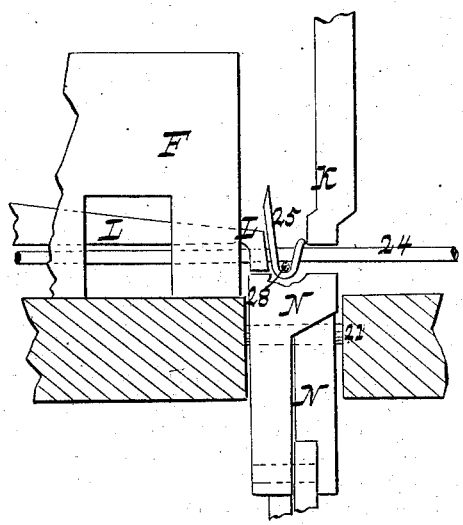
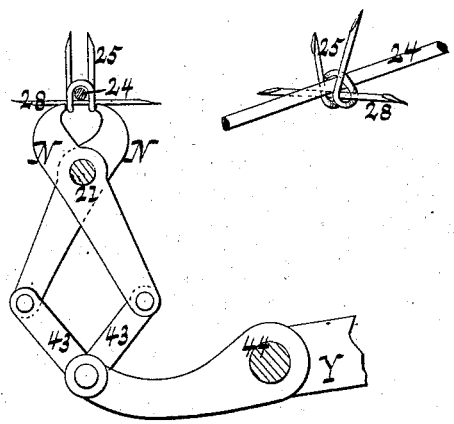
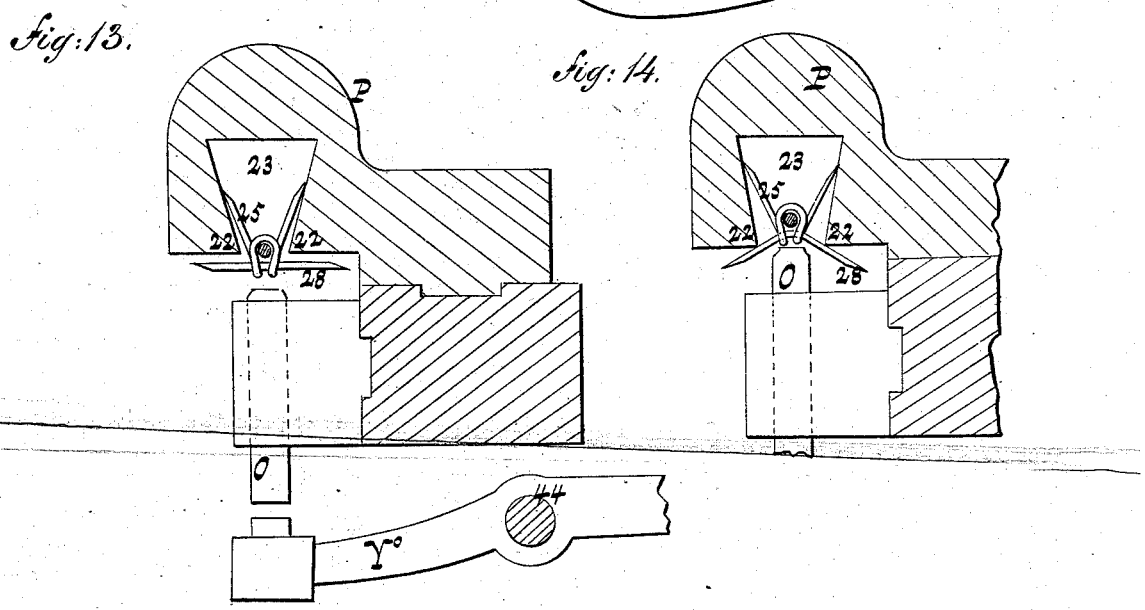

UNITED STATES PATENT OFFICE.

LEONARD A. SPRAGUE AND CHRISTIAN DANCEL, OF BROOKLYN, NEW YORK, ASSIGNORS TO SAID SPRAGUE.

MACHINE FOR MAKING BARBED FENCE-WIRE.

SPECIFICATION forming part of Letters Patent No. 242,706, dated June 7, 1881.

Application filed November 18, 1880. (No model.)

*To all whom it may concern:*

Be it known that we, LEONARD A. SPRAGUE and CHRISTIAN DANCEL, citizens of the United States, residing at Brooklyn, in the county of Kings and State of New York, have invented new and useful Improvements in Machines for Making Barbed Fence-Wire, of which the following is a specification.

This invention consists in a machine in which a main barb is cut, formed, and put on a fence-wire, whereupon a locking-barb is cut and inserted into the main barb, and the two are interlocked, the whole being accomplished automatically by mechanical means, as hereinafter fully described, and pointed out in the claims.

Figure 1:
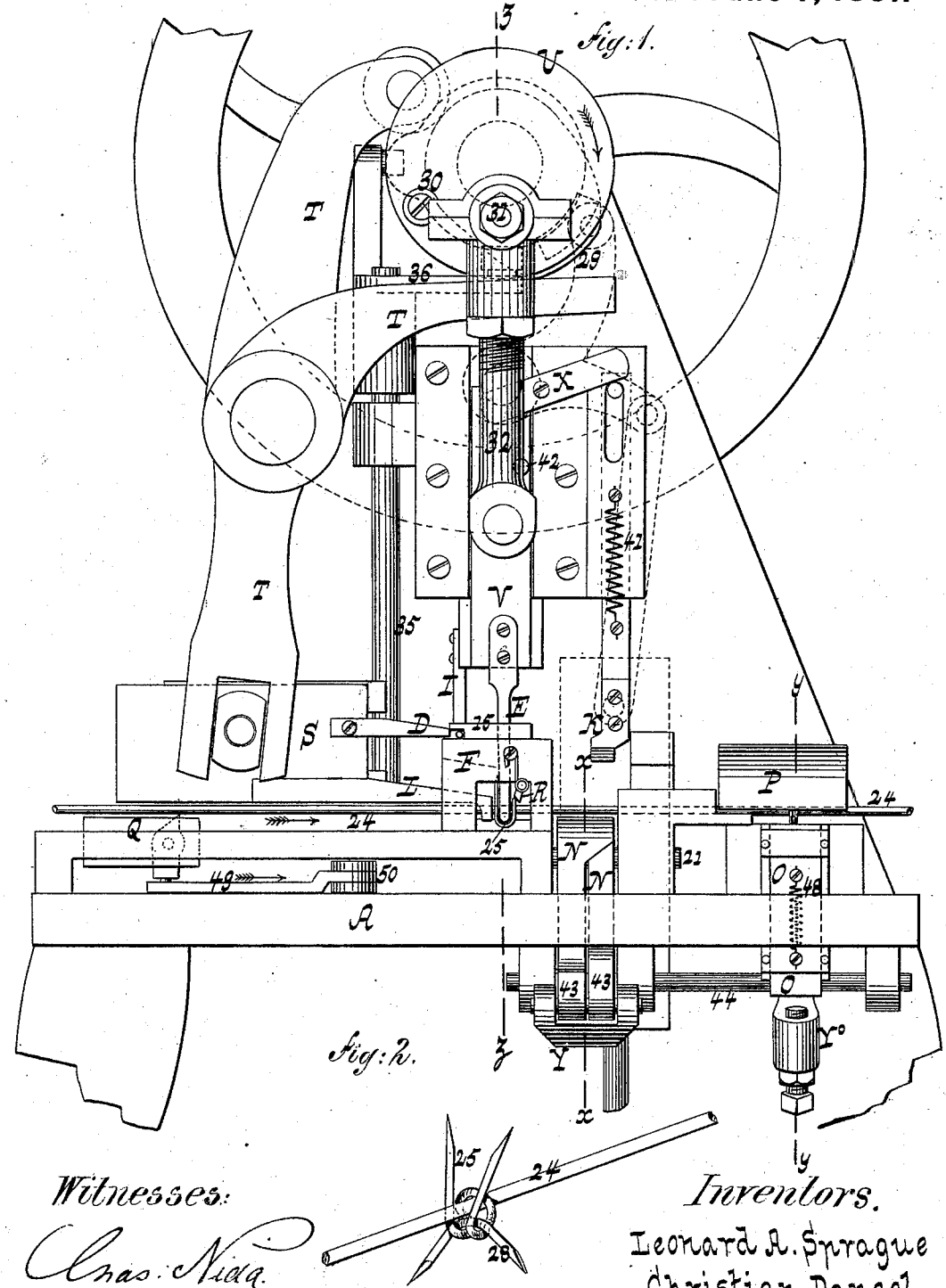
Figure 2:
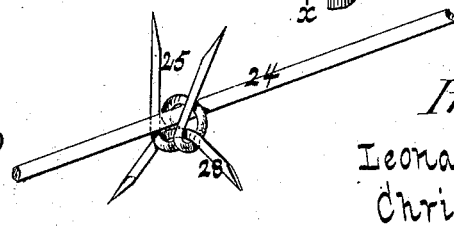

This invention is illustrated in the accompanying drawings, in which Figure 1 represents a front elevation of the machine. Fig. 1* is a vertical cross-section thereof on the line z z, Fig. 1. Fig. 1** is a side view, partly in section, looking in an opposite direction to Fig. 1*. Fig. 1*** is a vertical section on the line v v, Fig. 1*. Fig. 2 is a view of the fence-wire with its barbs. Fig. 3 is a plan or top view of the die, showing the manner of cutting the main barb. Fig. 4 is a like view thereof, showing the manner of giving to the main barb its first bend. Fig. 5 is a vertical section thereof, showing the manner of giving to the main barb its second bend and putting the same on the fence-wire. Fig. 6 is a like section, showing the locking-barb inserted into the main barb. Fig. 7 is a horizontal section of the die, showing the manner of cutting the locking-barb and inserting the same into the main barb. Fig. 8 is a view of the main barb. Fig. 9 is a view of the locking-barb. Fig. 10 is a front view of parts showing the manner of closing the second bend of the main barb. Fig. 11 is a cross-section on the line x x, Fig. 1, showing the manner of closing the first bend of the main barb. Fig. 12 shows the fence-wire with its barbs before the locking-barb is bent. Fig. 13 is a cross-section on the line y y, Fig. 1, showing the position of parts before the locking-barb is bent. Fig. 14 is a like section, showing the manner of bending the locking-barb.

Similar letters indicate corresponding parts. In the drawings, the letter A designates the bed-plate of the machine, B a standard or frame rising from the bed-plate, and C a shaft having its bearing on this standard, such shaft serving to drive the movable parts of the machine.

The letter D designates a former, having a horizontal reciprocating motion, and E a former having a vertical reciprocating motion, both co-operating with a die, F, for bending the main barb. The die F is constructed with gages 15 (best seen on Sheet 3) for determining the first bend of the main barb, and with gages 16 for determining its second bend, the gages last named being formed by the upper edges of a vertical passage, 17, in the die.

Upon suitable portions of the die F are arranged guides G H, (best seen in Figs. 3 and 7,) through which the strands of wire used to form the main barb and locking-barb, respectively, are introduced into the machine. The delivery end of both guides G H is made oblique, and with the guides are combined knives I J, having a reciprocating movement, one vertical and the other horizontal, past the oblique ends of the guides, respectively, so that as the wire strands are cut by these knives the ends thereof are left sharp or pointed. The wire strands referred to are introduced into the machine by feeders, one of which is represented in Fig. 1*, and which consist, respectively, of a reciprocating slide, 18, having pivoted thereto a griper, 19, which catches the wire to feed the same, but frees the wire on its return movement. A stop, 20, is preferably used to prevent the wire from moving back with the feeder.

On one side of the die F is located an abutment, K, (see Figs. 1 and 10,) having a vertical reciprocating motion, while from the opposite side of the die there extends into and through the same a pusher, L, having a horizontal reciprocating motion. At a point beneath and slightly in advance of the movable abutment K are situated two jaws, N, forming a pair of tongs, the same being hung on a pivot, 21, and being arranged to open and close at regular intervals.

Beyond the tongs N, in the direction of the delivery end of the machine, is located a finishing-hammer, O, having a vertical reciprocating motion, and above this hammer are two bending-gages, 22, (see Figs. 13 and 14,) formed by the edges of a channel, 23, in a head, P.

The operation of the machine is substantially as follows: The fence-wire 24, to which the barbs are to be applied, is drawn through the lower part of the die F, the same being at the same time presented to a feeder, Q, as shown in Fig. 1. The strand of wire for the main barb 25 now advances, and when a sufficient length thereof protrudes from the guide G it is cut by the knife I, as indicated in Fig. 3. The piece of wire thus cut off constitutes the main barb, and takes its place at one end of the bending-gages 15, where it is subjected to the action of the horizontal former D, by whose action it receives its first or middle bend, 26, as indicated in Fig. 4. The horizontal former D brings the main barb over or above the bending-gages 16 and then recedes, whereupon the vertical former E descends thereon, thus giving thereto its second bend, 27, and forcing it onto the fence-wire 24, as seen in Fig. 5. The vertical former E now recedes, leaving the barb on the fence-wire, where it is held by a yielding stop, R. The strand of wire for the locking-barb 28 then advances and enters the second bend, 27, of the main barb, between it and the fence-wire, as shown in Figs. 6 and 7, and when a sufficient length thereof protrudes from the guide H it is cut by the knife J. The fence-wire 24 is now propelled by the feeder Q in the direction indicated by arrows, and the pusher L moves with it, causing the barbs to partake of its motion. Simultaneously with the movement of the fence-wire and the pusher L the abutment K descends and takes its place immediately above the fence-wire and in the path of the main barb 25, as shown in Fig. 10. When the main barb comes in contact with the abutment K the fence-wire 24 ceases its motion, but the pusher L continues to move, so as to force the main barb against the abutment, by which means the second bend thereof is closed on the locking-barb. While the main barb 25 is clamped between the pusher L and the abutment K the jaws N shut, and, catching the barb beneath the fence-wire, close the first bend thereof, also on the locking-barb, thus bringing the whole to the condition shown in Fig. 12. The closing of the first bend of the main barb also has the effect of spreading the ends thereof, as clearly shown. When the main barb has thus been acted on both the pusher L and the abutment K recede and the jaws N open, thus releasing the barb; the fence-wire 24 then again advances until the barbs are brought above the finishing-hammer O, which then ascends, and, forcing the locking-barb 28 against the gages 22, gives to this barb a bend, as seen in Fig. 14. It will be readily seen that both barbs are thus cut, brought into place on the fence-wire, and firmly interlocked with each other without any manual labor, and the arrangement of parts is such that the barbs are put on at each movement of the fence-wire, thus making the operation of the machine a very rapid one.

The mechanism which I have adopted for operating the parts is as follows:

The horizontal former D is secured to a slide, S, which is subjected to the action of a triple-armed lever, T, this lever being moved in one direction by a cam, 29, (best seen in Fig. 1*,) and in the other direction by a trip-pin, 30, which is arranged on the face of a disk, U, fixed to the driving-shaft C.

The vertical former E is secured to a slide, V, which is connected to an eccentric pin, 31, on the disk U by a rod, 32.

The vertical knife I is secured to the slide V, so as to move with the vertical former, while the knife J is secured to a stock, 33, (see Fig. 7,) which is subjected to the action of an arm, 34, projecting from a vertical rock-shaft, 35, Figs. 1 and 7, this shaft carrying a secondary arm, 36, Figs. 1 and 1*, which is actuated by a projection, 37, on the cam 29.

The feeders for the wire strands from which the barbs are cut and formed are connected to levers W, Fig. 1*, by means of a link, 38, and the levers engage with cams 39 40, fixed to the driving-shaft.

The movable abutment K slides in a suitable guide, and it is moved to an upper position by a spring, 41, Fig. 1, while it is forced downward by the action of a lever, X, which is arranged in the path of a trip-pin, 42, on the slide V.

The jaws N are connected to one end of a lever, Y, Figs. 1, 1*, and 11, by links 43, this lever being fixed to a rock-shaft, 44, and its other end being pivoted to a vertical slide, Z, which is connected by a rod, 45, to a bell-crank, 46, subjected to the action of a cam, 47, on the driving-shaft. A spring, 53, serves to draw the slide Z downward.

The finishing-hammer O slides in suitable guides, and it is held in a lower position by a spring, 48, Fig. 1, while it is forced upward by the action of a lever, Y⁰, Figs. 1 and 13, which, like the lever Y, is fixed to the rock-shaft 44, and is oscillated by the latter.

The feeder Q for the fence-wire is connected by a link, 49, Fig. 1, to an arm, 50, which is fixed to a vertical shaft, 53, this shaft carrying a second arm, 51, which engages with a cam, 52, on the driving-shaft.

Other mechanism, however, may be substituted for that described without departure from my invention.

An important feature in the operation of my machine is the introduction of the locking-barb into the main barb after the latter has been put on the fence-wire and then cutting off the locking-barb.

The fence-wire produced by my machine is similar to that described in Letters Patent of the United States No. 200,783, dated February 26, 1878.

When the main barb 25 is put on the fence-wire the vertical former E straddles the latter, and for this purpose the former is bifurcated at its lower end, as clearly shown in Fig. 1*.

What we claim as new, and desire to secure by Letters Patent, is—

1. In a machine for making barbed fence-wire, the combination of the cutters I J, the formers D E, and the die F, all adapted to operate substantially as described.

2. In a machine for making barbed fence-wire, the combination of the cutters I J, the formers D E, the die F, the pusher L, and the movable abutment K, all adapted to operate substantially as described.

3. In a machine for making barbed fence-wire, the combination of the cutters I J, the formers D E, the die F, the pusher L, the movable abutment K, and the tongs N, all adapted to operate substantially as described.

4. In a machine for making barbed fence-wire, the combination of the cutters I J, the formers D E, the die F, the pusher L, the movable abutment K, the tongs N, and the finishing-hammer O, all adapted to operate substantially as described.

In testimony whereof we have hereunto set our hands and seals in the presence of two subscribing witnesses.

LEONARD A. SPRAGUE. [L. S.]
CHRISTIAN DANCEL. [L. S.]

Witnesses:
J. G. JENKINS,
CHAS. WAHLERS.